United States Patent Office 2,780,537
Patented Feb. 5, 1957

2,780,537
PROCESS OF TREATING PULVERULENT IRON OXIDES

Per Otto Stelling and Ivan Georg Magnus Pereswetoff-Morath, Stockholm, Sweden; said Pereswetoff-Morath assignor to said Stelling No Drawing. Application October 30, 1953,
Serial No. 389,453

Claims priority, application Sweden November 24, 1952

9 Claims. (Cl. 75—26)

The present invention relates to a process for treating pulverulent iron oxides, such as oxidic iron ores, calcined pyrites and the like, with carbon monoxide containing reducing gases in a fluidized bed in order to produce a powder predominantly consisting of iron carbide, which powder may be used as a starting material for making iron or iron alloys.

During the last decades a great number of proposals have been made for the direct reduction of iron oxides in the solid form. The object has been to find a substitute for the highly fuel-consuming blast-furnace processes. However, but few of these proposals have been realized for the production of iron on a large scale. The so-called Höganäs process, invented by E. Sieurin, and the so-called Wiberg-Söderfors process, invented by M. Wiberg, are probably the processes which have attracted the greatest attention. In the classical Höganäs process ceramic vessels are packed with alternate layers of finely divided ore (concentrates) and coal and are heated in gas-fired annular furnaces to about 1100° C. The carbon monoxide formed in the vessels is burnt and thus contributes to the heating. The combustion air is introduced in counter-current. The sponge iron is obtained as porous cakes having a diameter of about 300 mm. The main advantages of the Höganäs process are that any pulverulent oxidic iron material may be used, that sponge iron of a high degree of reduction is obtained, and that the cheapest fuels may be utilized as reducing agents. On the other hand, installation costs and labor requirements are relatively high. According to the Wiberg process the ore, which may be in the form of lumps or sinter, descends through a shaft and is reduced by means of carbon monoxide and hydrogen introduced at the bottom of the shaft with a temperature of 900° C. to 1000° C. After the gases have reduced FeO to Fe, about ¾ of the same are exhausted by suction at about half the height of the shaft and are introduced into an electric carburizing chamber, or carburettor, in which $CO_2$ is converted into CO and $H_2O$ into $H_2$. The rest of the gas is used for pre-reduction of the ore and is finally burnt by the introduction of air, thereby preheating the ore to 900–1000° C. Simultaneously a certain oxidation and desulphurization by roasting occurs. Amongst the advantages of the Wiberg process may be mentioned the low labor requirement and the fact that the necessary amount of heat may be produced by means of electric energy, which is important in countries with cheap electric power. On the other hand, the necessity of sintering the concentrates implies an increase of the processing costs, and moreover it is difficult to obtain a high degree of reduction.

In order to eliminate the drawbacks of the above-mentioned and other processes for the production of sponge iron, suggestions have been advanced during the last years to apply the so-called fluid solid technique also to this field. Such an application would benefit of the general advantages of this technique, viz. a large specific surface of the solid phase, and thus a high reaction velocity, high heat conductivity, uniformity of the product and flexibility of transport. However, hitherto positive results from using the fluid solid technique have been obtained only in connection with hydrogen reduction at low temperatures and when using a powder having a relatively low iron content. This is due to the fact that iron powder has a strong tendency to become sticky at temperatures above 600° C.

The main object of the present invention is to eliminate these difficulties. The process according to the invention for treating pulverulent iron oxides comprises adding said iron oxides to a bed containing a large proportion of iron carbide, and introducing into said bed, at the bottom thereof and at a temperature of minimum 400° C. but not exceeding a temperature at which the bed tends to become sticky, a reducing gas, the main reducing constituent of which is carbon monoxide and which does not contain hydrogen in an amount exceeding 50% by volume of the carbon monoxide content, said gas serving to keep the bed in a fluidized state and to convert the greater part of the iron oxides into iron carbide. A suitable temperature interval is from 400° C. to 900° C. preferably from 570° C. to 690° C. In addition to the iron carbide the pulverulent bed usually contains also ferrous oxide (FeO) and possibly a small proportion of metallic iron. Neither the iron carbide nor the ferrous oxide particles show the strong tendency of becoming sticky which is characteristic of particles of metallic iron, and for this reason the pulverulent bed according to the present invention may be kept in a uniform and homogeneous fluidized state.

If a pulverulent starting material, in which the iron is present as $Fe_2O_3$, is added to a fluidized bed of this kind, the ferric oxide is relatively rapidly reduced to FeO according to the following equations:

$$3Fe_2O_3 + CO = 2Fe_3O_4 + CO_2 \qquad (1)$$
$$2Fe_3O_4 + 2CO = 6FeO + 2CO_2 \qquad (2)$$

Furthermore the following reactions may occur:

$$FeO + CO = Fe + CO_2 \qquad (3)$$
$$3Fe + 2CO = Fe_3C + CO_2 \qquad (4)$$
$$3FeO + 5CO = Fe_3C + 4CO_2 \qquad (5)$$
$$2CO = C + CO_2 \qquad (6)$$
$$4FeO = Fe + Fe_3O_4 \qquad (7)$$

Under certain conditions still another iron carbide ($Fe_2C$), which is higher in carbon, may be formed. This carbide seems to be identical with a carbide described in the literature (cf. G. Hägg, Zeitschrift für Kristallographie, 89, 92–94, 1934).

If the temperature of the bed is kept above 570° C., which is the lower limit of stability of FeO, Reaction 7 may be left out of consideration. It has been found that a bed containing a large amount of FeO has a tendency to become sticky just in the temperature interval 550–580° C.

Which of the Reactions 3 to 6 that really do occur and to what extent said reactions consume carbon monoxide depends upon the velocity of the various reactions. A comprehensive investigation made with hematite, oxidized magnetite and calcined pyrites, all pre-reduced to FeO, shows that only a small part of the carbon monoxide reacts according to the Boudouard Reaction 6 in the temperature interval 570° C.–800° C. (We have found that when using pulverulent native magnetite ($Fe_3O_4$) as a starting material the velocity of the reactions between the FeO initially produced from this magnetite and carbon monoxide may be so slow that a considerable portion of the carbon monoxide reacts according to Equation 6. We have also found that this drawback may be eliminated by first oxidizing the native magnetite to $Fe_2O_3$.) Between 570° C. and 625° C. practically only Reaction 5 or, expressed in other words, the sum of Reactions 3 and 4 occur. Between 625° C. and 690° C. $Fe_3C$ as well as FeO are formed, i. e. Reactions 3 and 5 occur simultaneously. Between 690° C. and 800° C. FeO and CO react exclusively according to Equation 3. Moreover it has been observed that in a bed, consisting of Fe (produced by reduction) and $Fe_3C$ but containing no iron oxide, Reaction 4 occurs also at temperatures above 700° C.

A consequence of the fact that the reaction velocity of Reaction 6 is relatively low in a bed of the character described is that in a bed, containing predominantly $Fe_3C$, the above-mentioned $Fe_2C$ is quite surprisingly formed on continued introduction of carbon monoxide at 615° C. without the formation of noteworthy amounts of free carbon. This $Fe_2C$ reacts rapidly with added Fe and is quantitatively converted into $Fe_3C$ according to the equation:

$$Fe_2C + Fe = Fe_3C \qquad (8)$$

Without more closely discussing the different reactions and their mechanisms, and taking into consideration that of the different components of the bed only metallic iron has a strong tendency to become sticky within the pertinent temperature interval, the following suitable conditions may be stated for the production of iron carbide in a bed which is fluidized mainly by means of carbon monoxide (it being assumed by way of example that in the gas used the ratio volume CO to volume $CO+CO_2$ equals 0.9).

| Temperature interval | Main components of the powder bed |
|---|---|
| 580–625° C | $FeO + Fe_3C$ |
| 625–690° C | $FeO + Fe_3C + Fe$ |
| 690° C | $Fe_3C + Fe$ |

If the bed contains metallic iron the proportion thereof should be so low that there is no risk of the bed becoming sticky. The proportions of the various solid components of the bed at a certain temperature may be varied by changing the charging and discharging velocities.

An example showing how the process according to the present invention may be carried out is given below:

*Example*

The starting material is pulverulent calcined pyrites containing 66% Fe which is bound to oxygen as $Fe_2O_3$. The particles of the calcined pyrites comprise a great interval of sizes ranging from about 0.03 mm. to about 0.25 mm. with a great part of the material between about 0.05 and 0.10 mm. Without being preheated this powder is added to a fluidized bed kept at 615° C. and containing 66% of iron carbide and 29% of iron oxides, mainly in the form of FeO, together with small amounts of gangue and possibly of separated free carbon. A gas composed of about 90% by volume of carbon monoxide and 10% by volume of carbon dioxide is fed to the bed at the bottom thereof, this gas serving as a reducing agent and also to keep the bed in a fluidized state. The gas is preheated to about 675° C. and is introduced in such an amount that its linear velocity in the fluidization furnace at the temperature prevailing therein will be about 0.4 meter per second. The equation for the sum of the reactions occurring in the bed is:

$$2Fe_2O_3 + 27.88CO + 3.10CO_2 = \\ 1.07FeO + 0.98Fe_3C + 21CO + 9CO_2 \qquad (9)$$

From the top of the bed a gas is discharged which is composed of about 70% by volume of carbon monoxide and 30% by volume of carbon dioxide. Furthermore, a powder of the average composition of the bed is discharged from the bed.

The carbide production may form part of a process for making metallic iron, in which case the powder discharged from the carbide production bed with a temperature of 615° C. is fed to another furnace, such as a rotary or other suitable kiln, which is heated to 800° C. so that the powder introduced into the same will partly stick. The sum equation for the reactions taking place between the iron oxide and the iron carbide in the charge may be written:

$$1.1FeO + Fe_3C = 4.1Fe + 0.9CO + 0.1CO_2 \qquad (10)$$

The iron in the material discharged from the furnace is practically completely in metallic form. Its heat content may be utilized in any suitable manner. The heat necessary for the reaction may be obtained from gases produced in a carburettor which gases are caused to flow through the furnace and are cooled therein from 1000° C. to 800° C. The heat may of course also be supplied electrically.

The circulation of the gases through such a plant may be as follows: From the carburettor a gas composed of about 90% by volume of carbon monoxide and 10% by volume of carbon dioxide and having a temperature of 1000° C. is fed to the iron production furnace, said gas being desulphurized, if necessary. In the iron production furnace the gas is cooled to 800° C. It then passes through a heat exchanger together with the gas formed at the reaction in the iron production furnace. In the heat exchanger the combined gases are cooled to 675° C. The gas then flows to the fluidization furnace where its temperature falls to 615° C. When leaving this last-mentioned furnace the gas contains about 70% by volume of carbon monoxide and passes through a fan blower. About 85% of this gas are fed to the above-mentioned heat exchanger and are heated therein to about 750° C., while the remaining 15% may be used as fuel, e. g. for further heating the gas leaving the heat exchanger before this gas is introduced into the carburettor. In the carburettor the greater part of the carbon dioxide is regenerated to carbon monoxide by means of a suitable fuel having a high content of carbon. The heat necessary for the carburettor may suitably be produced by means of electricity.

If the starting material for the process consists of $Fe_2O_3$ and/or $Fe_3O_4$, the carbide production furnace may be preceded by a pre-reduction stage in which said oxides are reduced to FeO in a fluidized bed at a temperature between 600° C. and 850° C. by means of the off-gases leaving the carbide production bed. Simultaneously a considerable part of sulphide-bound sulphur, which might be present, distills off. Furthermore, a combined preheating and desulphurizing furnace with a fluidized bed may be connected to the pre-reduction (carbide production) furnace at the end thereof at which the powder is introduced into the last-mentioned furnace.

As mentioned above, the powder obtained in the carbide production furnace consists almost exclusively of iron carbide or contains a great proportion of iron carbide and smaller proportions of iron oxides and/or iron. In oxidizing the iron carbide to iron the oxidizing agent may consist of iron oxides which may be present in the produced powder or may be added to the same. This oxidation may also advantageously be carried out in steel furnaces of a construction known per se. In such a case air may also be used as the oxidizing agent.

The present invention is not restricted to the example given above but comprises also processes in which the reducing gas in addition to carbon monoxide contains also hydrogen and/or methane and/or other hydrocarbons in the gaseous state as reducing agents. If hydrogen is present in the gas, the content thereof should be low enough so that the reaction between the reactive carbide carbon and the hydrogen, occurring at high hydrogen pressures, does not significantly increase the content of the bed of metallic iron at the cost of its iron carbide content. It has been found that for this purpose the hydrogen content of the gas should not exceed 50%, and preferably not 30–35% by volume of the carbon monoxide content.

The invention also comprises processes in which a powder capable of counter-acting the tendency of the bed to become sticky, such as lime or coal powder, is added to the bed.

The iron oxides may be added continuously or intermittently to the pulverulent bed, and material may also be discharged therefrom continuously or intermittently. According to one embodiment of the invention the iron oxides in a first stage are added continuously to the bed substantially without discharging material from the bed, so that the volume of the bed increases, while in a second stage material is discharged from the bed so that the volume of the bed decreases, this procedure being then repeated.

What we claim is:

1. The process of treating pulverulent iron oxides, which comprises adding said iron oxides to a pulverulent bed containing a large proportion of iron carbide, and introducing into said bed, at the bottom thereof and at a temperature of minimum 400° C. but not exceeding a temperature at which the bed tends to become sticky, a reducing gas the main reducing constituent of which is carbon monoxide and which does not contain hydrogen in an amount exceeding 50% by volume of the carbon monoxide content, for keeping said bed in a fluidized state and for converting the greater part of said iron oxides into iron carbide.

2. The process of treating pulverulent iron oxides, which comprises adding said iron oxides to a pulverulent bed containing a large proportion of iron carbide, and introducing into said bed at the bottom thereof and at a temperature between 400° C. and 900° C. a reducing gas, the main reducing constituent of which is carbon monoxide and which does not contain hydrogen in an amount exceeding 50% by volume of the carbon monoxide content, for keeping said bed in a fluidized state and for converting the greater part of said iron oxides into iron carbide.

3. The process of treating pulverulent iron oxides, which comprises adding said iron oxides to a pulverulent bed containing a large proportion of iron carbide, and introducing into said bed at the bottom thereof and at a temperature between 570° C. and 690° C. a reducing gas, the main reducing constituent of which is carbon monoxide and which does not contain hydrogen in an amount exceeding 50% by volume of the carbon monoxide content, for keeping said bed in a fluidized state and for converting the greater part of said iron oxides into iron carbide.

4. The process of treating pulverulent iron oxides, which comprises adding said iron oxides to a pulverulent bed containing a large proportion of iron carbide, and introducing into said bed at the bottom thereof and at a temperature between 570° C. and 625° C. a reducing gas, the main reducing constituent of which is carbon monoxide and which does not contain hydrogen in an amount exceeding 50% by volume of the carbon monoxide content, for keeping said bed in a fluidized state and for converting the greater part of said iron oxides into iron carbide.

5. The process of treating pulverulent iron oxides, which comprises adding said iron oxides to a pulverulent bed containing a large proportion of iron carbide, and introducing into said bed, at the bottom thereof and at a temperature of minimum 400° C. but not exceeding a temperature at which the bed tends to become sticky, a reducing gas which contains carbon monoxide and hydrogen and in which the hydrogen content does not exceed 30% by volume of the carbon monoxide content, said gas keeping the bed in a fluidized state and converting the greater part of said iron oxides into iron carbide.

6. The process of treating pulverulent iron oxides, which comprises adding said iron oxides to a pulverulent bed containing a large proportion of iron carbide, and introducing into said bed, at the bottom thereof and at a temperature of minimum 400° C. but not exceeding a temperature at which the bed tends to become sticky, a reducing gas, the main reducing constituent of which is carbon monoxide and which moreover contains carbon dioxide, hydrogen and water vapor, and in which the ratio volume $CO+H_2$ to volume $CO+H_2O$ is minimum 9 to 1 and in which the hydrogen content does not exceed 50% by volume of the carbon monoxide content, said gas keeping the bed in a fluidized state and converting the greater part of the iron oxides into iron carbide.

7. The process of treating pulverulent iron oxides, which comprises adding said iron oxides to a pulverulent bed containing a large proportion of iron carbide, and introducing into said bed at the bottom thereof and at a temperature of minimum 400° C., but not exceeding a temperature at which the bed tends to become sticky, a reducing gas which contains carbon monoxide and carbon dioxide and in which the ratio volume CO to volume $CO_2$ is minimum 9 to 1, said gas keeping the bed in a fluidized state and converting the greater part of the iron oxides into iron carbide.

8. The process of treating pulverulent iron oxides, which comprises adding said iron oxides to a pulverulent bed containing a large proportion of $Fe_3C$ and a smaller proportion of FeO, introducing into said bed, at the bottom thereof and at a temperature of minimum 400° C. but not exceeding a temperature at which the bed tends to become sticky, a reducing gas, the main reducing constituent of which is carbon monoxide and which does not contain hydrogen in an amount exceeding 50% by volume of the carbon monoxide content, for keeping the bed in a fluidized state and for converting the greater part of the iron oxides into a mixture containing $Fe_3C$ and FeO, discharging such mixture from the bed, and heating the same for producing metallic iron, CO and $CO_2$.

9. The process of treating pulverulent iron oxides, which comprises adding said iron oxides to a pulverulent bed containing a large proportion of $Fe_3C$ and a smaller proportion of FeO, introducing into said bed at the bottom thereof and at a temperature between 570° C. and 625° C. a reducing gas, the main reducing constituent of which is carbon monoxide and which does not contain hydrogen in an amount exceeding 50% by volume of the carbon monoxide content, for keeping the bed in a fluidized state and for converting said iron oxides into a mixture composed substantially of FeO and $Fe_3C$ in a molecular ratio of about 1.1 to 1, discharging such mixture from the bed, and heating the same for producing metallic iron, CO and $CO_2$.

References Cited in the file of this patent

UNITED STATES PATENTS

| | | |
|---|---|---|
| 1,775,713 | Bailey | Sept. 16, 1930 |
| 2,382,601 | Boegehold | Aug. 14, 1945 |